United States Patent [19]
Mander

[11] 3,766,681
[45] Oct. 23, 1973

[54] TENSION RELEASE FOR FISHING EQUIPMENT

[76] Inventor: Harold C. Mander, 1375 East 53rd St., Brooklyn, N.Y.

[22] Filed: June 15, 1971

[21] Appl. No.: 153,321

[52] U.S. Cl............ 43/43.12, 24/201 TR, 24/243 B, 151/41.5
[51] Int. Cl.............................................. A01k 97/00
[58] Field of Search........................... 43/43.12, 25; 24/115 F, 201 TR, 243 B; 151/41.5

[56] References Cited
UNITED STATES PATENTS

| | | | |
|---|---|---|---|
| 3,199,242 | 8/1965 | Holmstrom | 43/43.12 X |
| 3,352,467 | 11/1967 | Parlante et al. | 24/201 TR X |
| 2,144,140 | 1/1939 | Batcheller | 24/243 B UX |
| 160,862 | 3/1875 | Adgate | 151/41.5 |
| 2,605,568 | 8/1952 | Riley | 43/43.12 UX |

Primary Examiner—Louis G. Mancene
Assistant Examiner—Daniel J. Leach
Attorney—I. Walton Bader

[57] ABSTRACT

A tension release device for use with fishing equipment includes a pair of resilient inwardly biased arms connected to one another at one end and abutting one another at the opposite end. The arms are outwardly bowed at their intermediate portions. A threaded member having a head at one end and a nut at the other end passes through the arms and can increase or decrease the tension at the abutting ends of the arms. A fishing line is normally disposed within the arms but can pass through their abutting portions if a predetermined force is exceeded.

1 Claim, 9 Drawing Figures

Patented Oct. 23, 1973
3,766,681
2 Sheets-Sheet 1
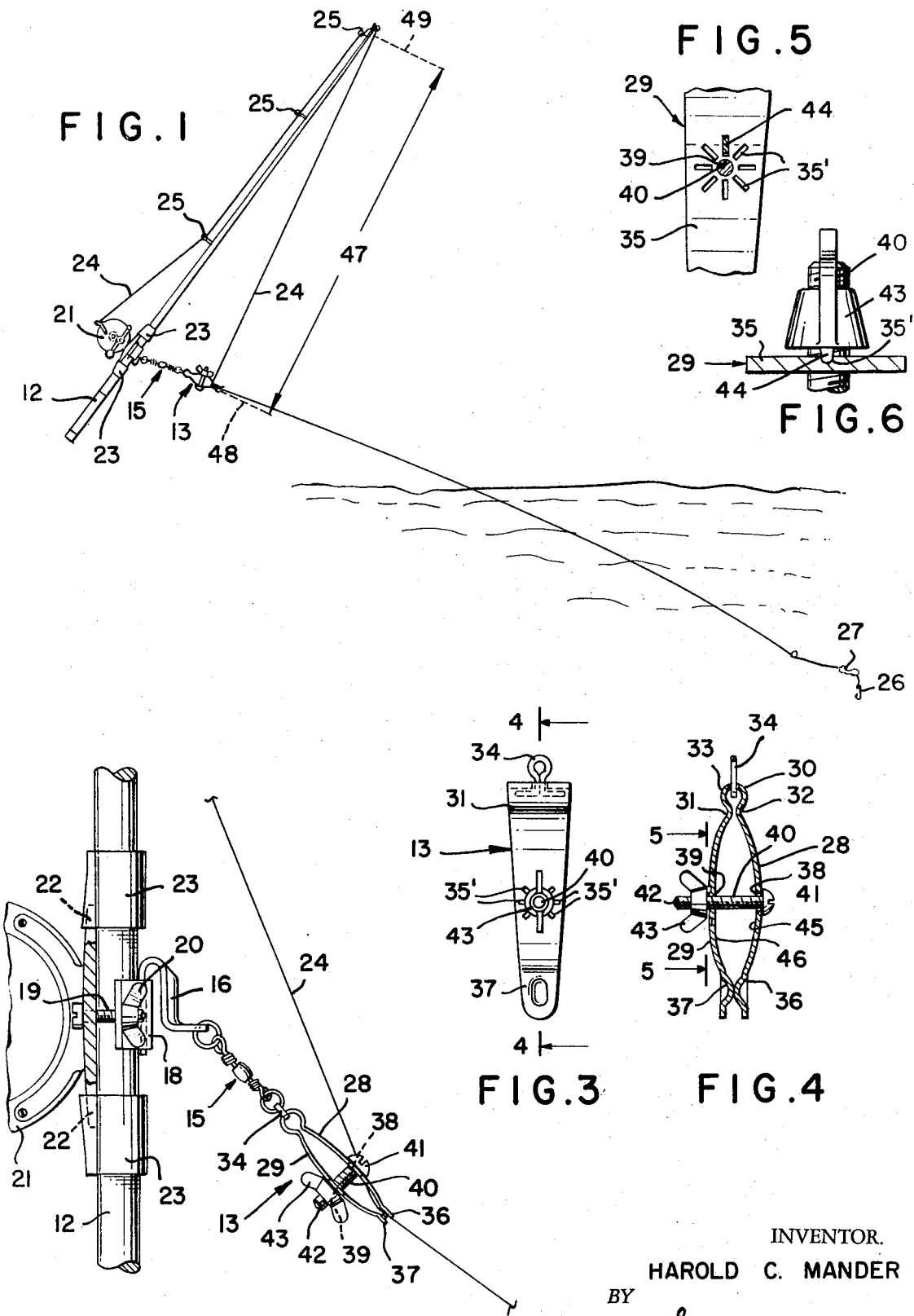
INVENTOR.
HAROLD C. MANDER Patented Oct. 23, 1973
3,766,681
2 Sheets-Sheet 2
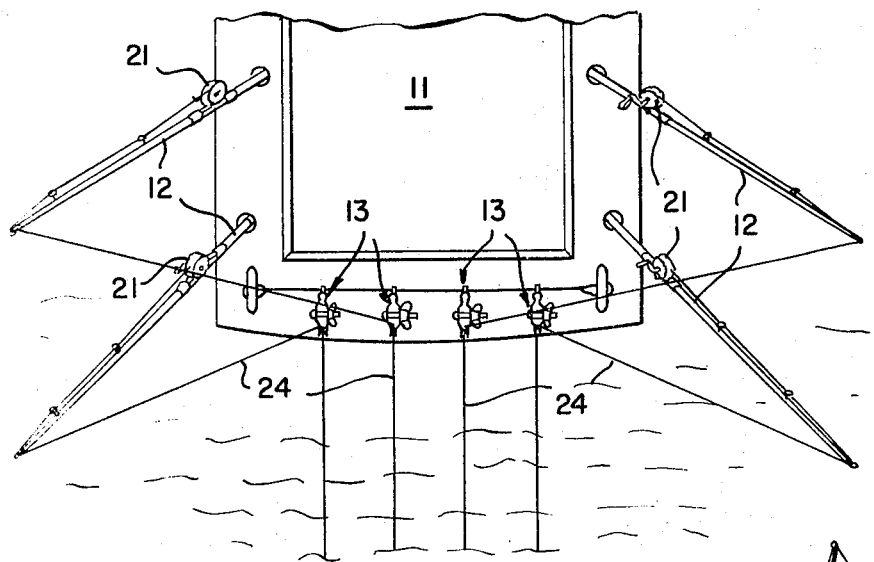
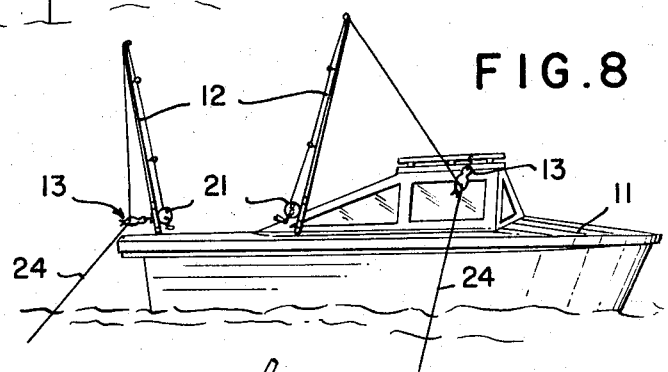
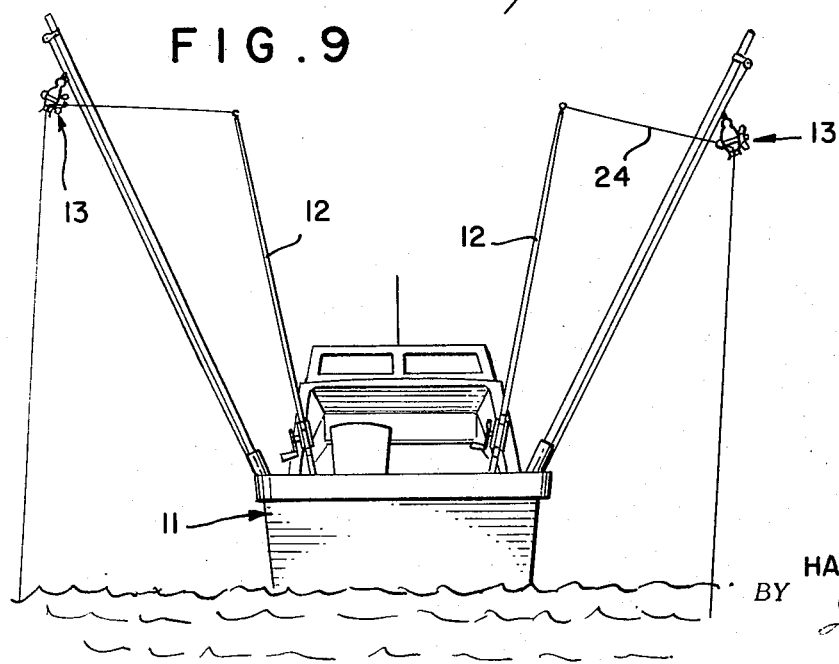
INVENTOR.
HAROLD C. MANDER
BY
ATTORNEY

TENSION RELEASE FOR FISHING EQUIPMENT

DESCRIPTION OF THE INVENTION

The invention described herein relates to fishing and is particularly applicable to use as a tension release device in fishing with rod and reel in "trolling mode."

In this type of fishing technique a baited line having a hook thereupon is permitted to extend from the rear of a moving boat. The movement of the line indicates, to a fish, the movement of a food organism and the fish bites the hook. In order to insure that the hook is retained within the fish's jaws the tension of the line should be released at that point. Also, depending upon the fish sought, the release of tension should occur only when a predetermined force is reached.

Tension release devices of various types have been employed for this purpose. These devices generally have some type of means to hold the line in the normal "trolling" mode and release the line at the time that a fish strikes. The prior devices, however, have had a number of disadvantages. These disadvantages are as follows:

1. The prior art device would prematurely release.
2. The prior art device would not release when desired.
3. The prior art device was costly to manufacture.
4. The prior art device had no means for adjusting the release pressure depending upon the size of the fish to be caught.

The device of the present invention avoids the disadvantages of prior structures and produces a device which is simple, foolproof and inexpensive to manufacture.

The tension release device of this invention may be briefly described as comprising, in combination, a support member of resilient material (preferably spring steel) which includes a pair of arms connected to one another at one end and abutting one another at the opposite end. The arms include an intermedaite outwardly bowed portion and means are provided to selectively compress the arms toward one another.

The tension release device is also one part of a fishing mechanism combination which includes a pole member, a reel member, and a line member. The tension release device is secured to the pole member adjacent the reel and the line normally is retained within the bowed portion adjacent the abutting arms but is released therefrom when a tension of a predetermined value is imposed.

The above constitutes a brief description of this invention and the principal objects and advantages thereof. Other objects and advantages of this invention will become apparent to the reader of this specification as this description proceeds.

The invention will be further described by reference to the accompanying drawings which are made a part of this specification.

FIG. 1 is a somewhat diagrammatic side view of a fishing pole, reel and line to which is attached the tension release device of this invention.

FIG. 2 is a detail side elevational view, on an enlarged scale and partly in section, of a portion of the fishing pole, reel support members and the tension release device of this invention.

FIG. 3 is a front elevational view, on an enlarged scale to that of FIGS. 1 and 2, of the tension release device of this invention.

FIG. 4 is a sectional view of the form of invention shown in FIG. 3 taken along lines 4—4 of FIG. 3.

FIG. 5 is a fragmentary cross-sectional view, on an enlarged scale to that of FIG. 4, taken along lines 5—5 of FIG. 4.

FIG. 6 is a side elevational view, partly in section, of the wing nut member and the associated portion of the arm of the tension release device of this invention showing the manner in which the wing nut member is selectively retained within a depression within the appropriate arm.

FIG. 7 is a diagrammatic plan view of a boat with a plurality of fishing poles disposed thereupon in "trolling" relationship showing a manner in which the tension release devices of this invention may be employed.

FIG. 8 is a diagrammatic side view of a boat with a plurality of fishing poles disposed thereupon in "trolling" relationship showing another manner in which the tension release device of this invention may be employed.

FIG. 9 is a rear view of a boat with a plurality of fishing poles disposed thereupon in "trolling" relationship showing still another manner in which the tension release devices of this invention may be employed.

The invention will now be further described by reference to the specific form shown therein in the accompanying drawings which represent the best mode known to the inventor of taking advantage of his invention. In this connection, however, the reader is cautioned to note that the specific form of this invention as set forth in the specification herein is for illustrative purposes and for purposes of example only. Various changes and modifications could obviously be made within the spirit and scope of this invention.

In the specific form of invention shown in the drawings a boat 11 has a plurality of fishing poles 12 attached thereto. A plurality of tension release devices 13 are secured in position in various ways by means of supports which are secured to the boat 11 or to the fishing pole 12. In addition the tension release device 13 of this invention can be secured to a flexible support 15 which in turn can be secured to a rigid support 16 which in turn can be secured to an additional support 18 which in turn is fastened to a fishing pole 12 by means of headed screw 19 and wing nut 20.

The manner of attachment of the tension release device of this invention to a fishing pole is most frequently employed in the manner shown in FIG. 2 of the drawings and it is noted that support 18 is adjacent reel 21. In FIG. 2, also, reel 21 is attached to pole 12 by means of a pair of oppositely extending arms 22 which are retained within holding members 23.

The fishing line 24 extends from reel 21 along pole 12 through grommets 25 and thence through tension release device 13 to hook 26 and sinker 27.

The tension release device 13 is formed with a pair of arms 28 and 29 which are interconnected at one end 30. Beneath end 30 and immediately adjacent thereto the opposite lateral portions 31 and 32 of arms 28 and 29 are inturned so that a holding opening 33 is formed. Ring member 34 is secured within opening 33 (FIG. 3) and member 34 can in turn be connected to flexible member 15, supports 14 or the like.

The outer face 35 of arm 29 is provided with a plurality of radially spaced opening 35'.

Arm members 28 and 29 are preferably made of spring steel and are resiliently biased toward one another. The opposite end portions 36 and 37 of arms 28 and 29 are inturned toward one another and abutting. Each of arms 28 and 29 is provided with an opening 38 and 39 therewithin and openings 38 and 39 are laterally aligned with one another. A threaded member 40 bearing a head 41 and an opposite end portion 42 is disposed within openings 38 and 39. A wing nut 43 having a projection 44 is threadedly secured to portion 42 with projection 44 selectively entering opening 35'.

Each of arm members 28 and 29 carries an intermediate bowed portion 45 and 46 and bowed portions 45 and 46 are inwardly biased by reason of member 40.

With the foregoing specific description the operation of this invention will now be explained.

The tension release device of this invention is secured in position as shown in the drawings. The line 24 of the fishing pole will then normally be retained within portions 45 and 46 of device 13 adjacent the abutting portions 36 and 37. The desired tension of the device will be created by turning wing nut 43 and engaging projection 44 within an opening 35'.

When trolling is performed the parts will assume, for example, the configuration shown in FIG. 1. When a fish bites the hook 26 and produces or exceeds the predetermined amount of tension release previously set in the device then line 24 will be moved against the abutting portions 36 and 37 of arms 28 and 29 and will cause these members to move apart releasing the line from its position within the device. The degree of play produced is shown by the length 47 of the line which extends between dotted lines 48 and 49 in FIG. 1.

The release of tension produced and the line play caused thereby will permit the fish to "take the hook" which will become imbedded in its mouth and the fish can then be landed by conventional methods.

The foregoing sets forth the manner in which the objects of this invention are achieved.

I claim:

1. A fishing device comprising a flexible pole member, a line reel secured to said pole member at an intermediate portion thereof, a line secured to said reel member and extending along said pole, a first support element connected to said pole adjacent said reel, a second support element connected to said first support element, a third flexible support element connected to said second support element, a tension release device having a pair of inwardly biased arms connected to one another at one end, abutting one another at their opposite ends and having an intermediate outwardly bowed portion connected to said third support element at the junction of said arms, said arms also having a pair of inwardly oppositely extending portions at their abutting ends, said arms also provided with a pair of laterally aligned openings within their intermediate portions, a threaded member headed at one end disposed within said openings and a wing nut disposed upon the opposite end of said threaded member, the outer face of one of said arms having a plurality of spaced openings therewithin and said wing nut having a projection selectively abutting said openings, said line member normally disposed within the bowed portion of said arms and abutting the inwardly disposed portions of said arms but adapted to be released therefrom if a tension force of a specific value is imposed.

* * * * *